United States Patent [19]

Odom

[11] Patent Number: 4,765,432

[45] Date of Patent: Aug. 23, 1988

[54] MOTORCYCLE HAVING A SUSPENSION COUPLED SEAT

[76] Inventor: H. Paul Odom, 1711 Forest Cove Dr., Mt. Prospect, Ill. 60056

[21] Appl. No.: 52,837

[22] Filed: May 21, 1987

[51] Int. Cl.[4] ............................................. B62K 25/20
[52] U.S. Cl. ..................................... 180/227; 280/284
[58] Field of Search ................ 180/219, 227; 280/284, 280/285, 283, 288

[56] References Cited

U.S. PATENT DOCUMENTS

| | | | |
|---|---|---|---|
| 1,157,431 | 10/1915 | Shimmin | 280/284 |
| 3,974,892 | 8/1976 | Bolger | 280/284 X |
| 4,558,761 | 12/1985 | Boyesen | 180/227 |

FOREIGN PATENT DOCUMENTS

| | | | |
|---|---|---|---|
| 2457291 | 6/1975 | Fed. Rep. of Germany | 180/227 |
| 706222 | 3/1954 | United Kingdom | 280/284 |
| 767101 | 1/1957 | United Kingdom | 280/284 |

Primary Examiner—John J. Love
Assistant Examiner—Charles R. Watts
Attorney, Agent, or Firm—Charles F. Lind

[57] ABSTRACT

A motorcycle is disclosed having a seat suspension system that is designed to move said seat in the opposite direction, relative to the frame, from the rear wheel when the rear wheel encounters bumps. A structural member is pivotally connected to the backbone of the frame at a location above the motor or near there. This pivoting structural member supports the seat and other components such as rear lights, side panels, rear fender, etc. It is caused to move downward relative to the main frame in response to upward motion of the rear suspension, by linkage means connecting it to the rear suspension. As the motorcycle frame experiences sudden upward motion due to bumps transmitted through the wheel suspension, the seat moves downward at the same time to prevent those bumps from disturbing the rider.

18 Claims, 15 Drawing Sheets

MOTORCYCLE HAVING A SUSPENSION COUPLED SEAT

FIELD OF THE INVENTION

This invention relates primarily to motorcycles, but also to three and four wheeled All Terrain Vehicles with motorcycle type seats, and having any suspension system in which a rear wheel is constrained to travel in a mostly vertical path relative to the vehicle's main suspended frame, for the purpose of preventing road surface irregularities from being transmitted to the rider.

BACKGROUND OF THE INVENTION

Motorcycles generally have primary suspension systems at each end of the frame for the front and/or for the rear wheels. A seat is mounted on the frame for the rider, the seat having foam padding or small springs built into it to reduce the effect of vertical frame motion on the rider. However, otherwise the seat is fixed relative to the motorcycle frame, and there is no known secondary suspension system for the seat, which works in conjunction with the primary suspension systems. No known system exists in which the seat is supported with a degree of freedom of motion relative to the motorcycle frame, or in which the seat is kinematically linked to the rear suspension system to move relative to the frame. Linkages and components incorporated in the various embodiments of this invention of course were known, but those linkages or components were never proposed to accomplish the function realized by the invention to be disclosed.

SUMMARY OF THE INVENTION

This invention provides a mechanical system in a motor vehicle frame that enhances the effectiveness of present suspension systems in terms of preventing road surface irregularities from being transmitted to the rider, thereby allowing the rear wheel suspension to be tuned for better handling performance without sacrificing ride comfort. The invention provides for vertical motion of the seat or a whole seat assembly, relative to the frame, in conjunction with vertical motion of the rear suspension resulting from bumps or otherwise unsmooth surface conditions, to further isolate the rider from surface irregularities encountered by the vehicle. The seat is directly or indirectly caused to move downward relative the main frame of the vehicle in response to upward deflection of the wheel suspension system, and vice versa.

BRIEF DESCRIPTIONS OF THE DRAWINGS

Figure 9:
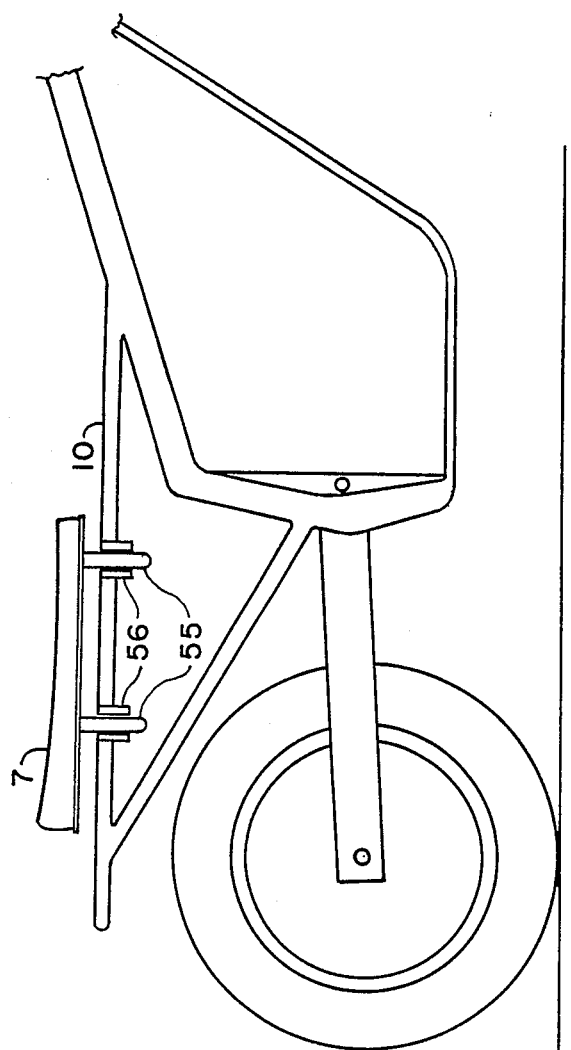

FIG. 9 is a side elevational view of the seat and rear portion of a motorcycle with a cutaway view of the vehicle frame portion below the seat, which has guide holes for shafts which are attached to the seat and can move up and down within the guide holes such that the seat can move up and down relative to the frame in response to any linkage connecting it to the rear suspension, not shown for clarity of disclosure.

Figure 10:
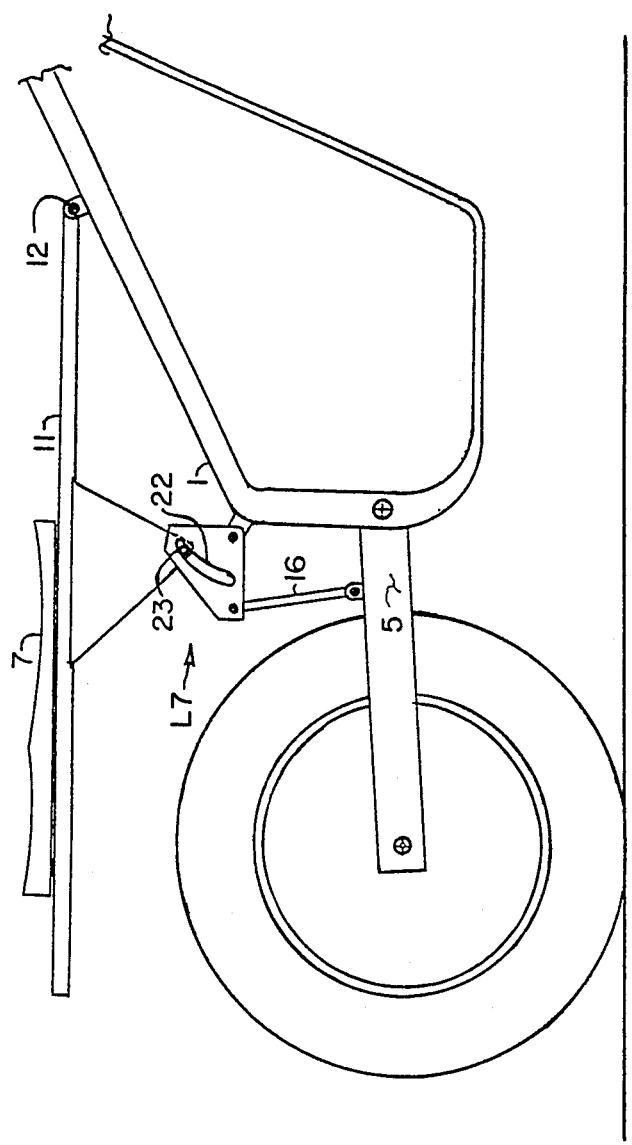

FIG. 10 is a side elevational view of the rear portion of a motorcycle, illustrating the seat assembly being coupled to the rear suspension by means of a cam and follower.

Figure 11:
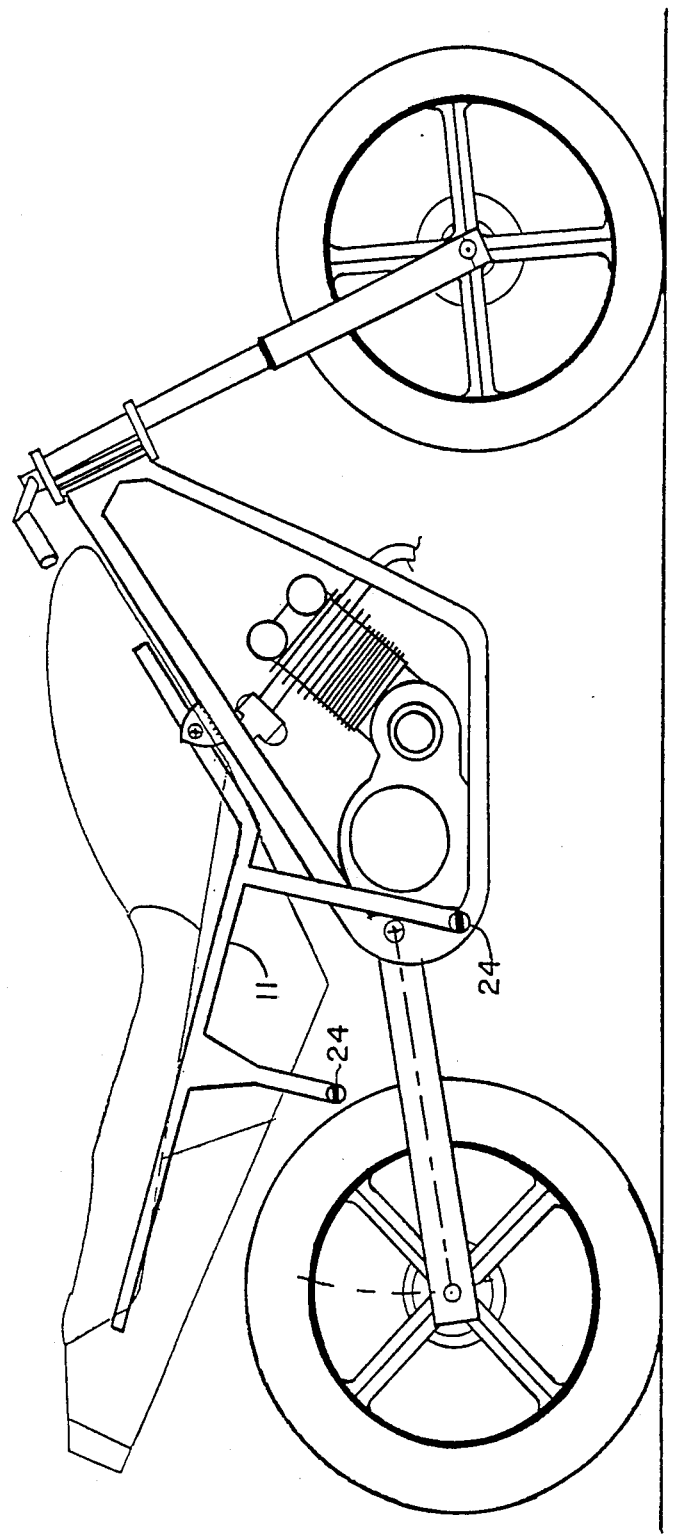

FIG. 11 is a side elevational view of a motorcycle and seat assembly, illustrating structural extensions off of the seat assembly to support footrests for the rider and passenger; although no linkage between the seat assembly and the rear suspension is shown in this figure.

Figure 12:
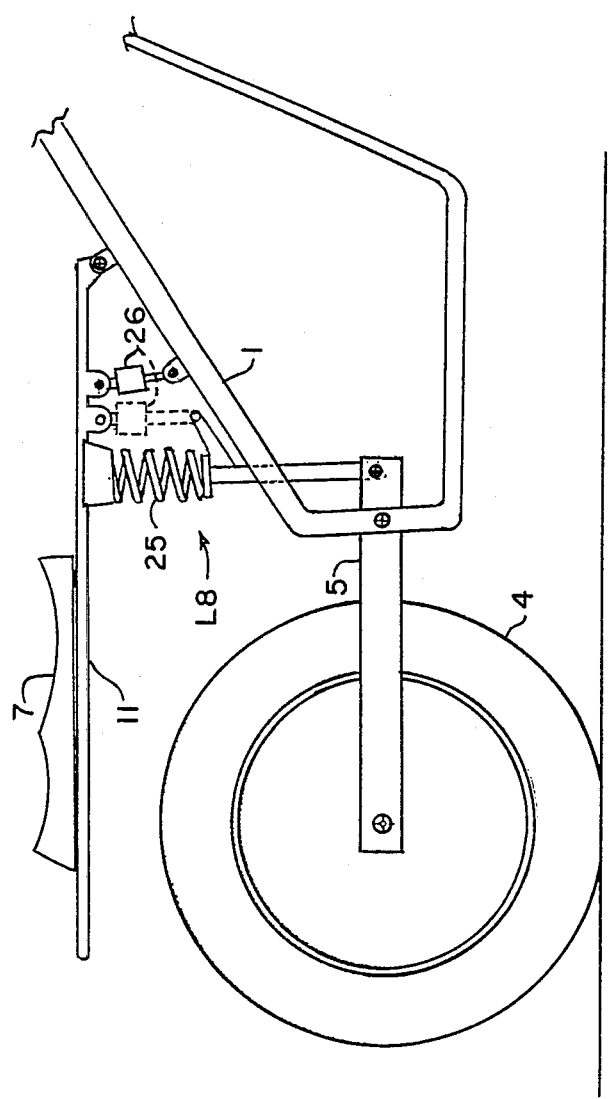

FIG. 12 is a side elevational view of the rear portion of a motorcycle, illustrating a spring and damper combination in place of a rigid link.

Figure 13:
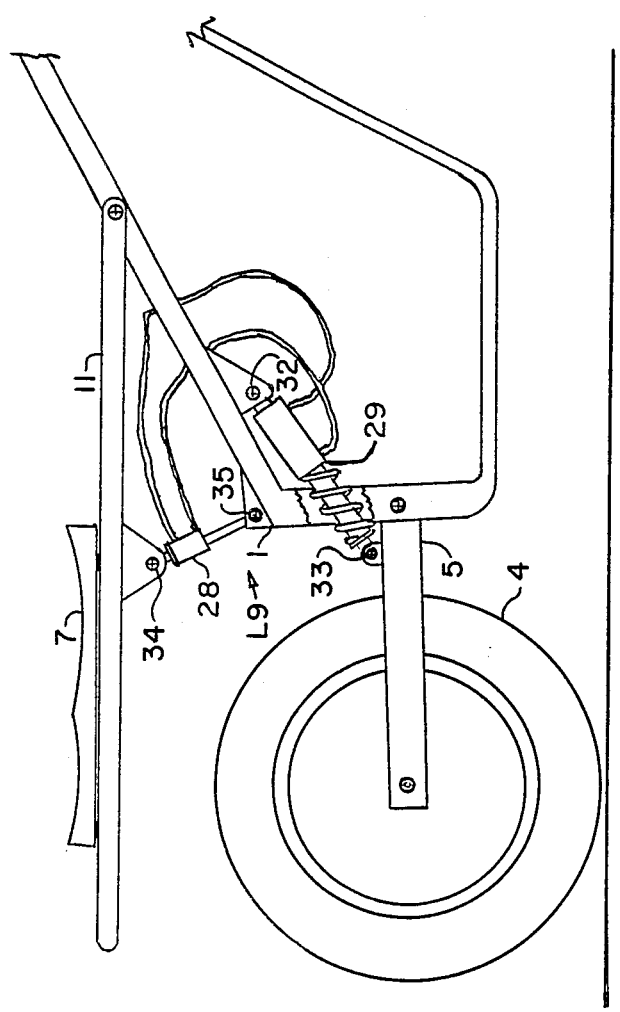

FIG. 13 is a side elevational view of the rear portion of a motorcycle, illustrating a power piston-cylinder device between the seat assembly and frame and a system hydraulically or pneumatically coupling said device to the damper used to control the motion of the rear wheel.

Figure 14:
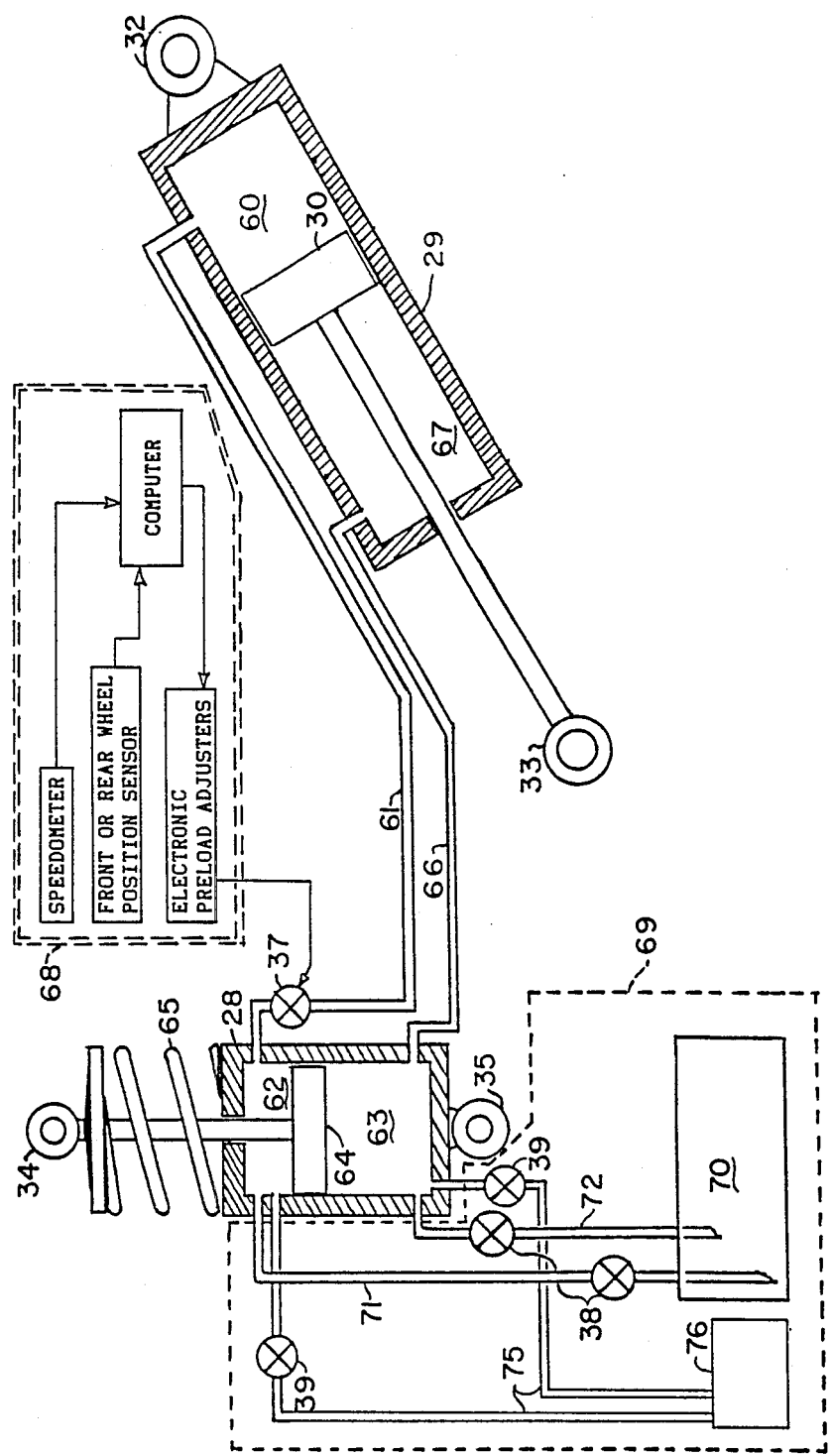

FIG. 14 shows a detailed arrangement of the same system of FIG. 13 and the principle components.

Figure 15:
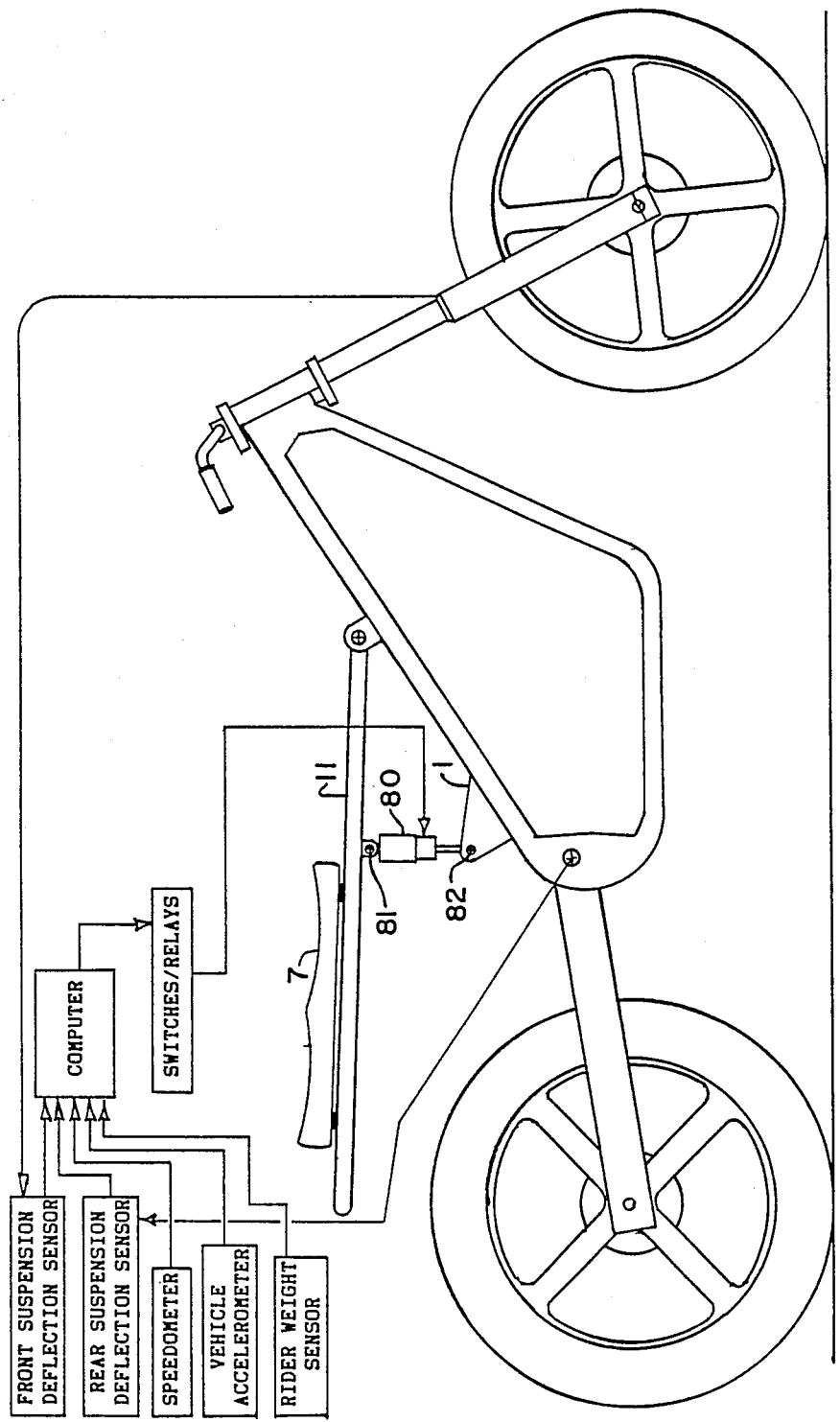

FIG. 15 is a side elevational view of a motorcycle similar to that shown in FIG. 13, and illustrating an electronic control for adjusting the elevation of the rear of the seat assembly relative to the frame.

DETAILED DESCRIPTIONS OF PREFERRED EXAMPLES OF THE INVENTION

Motorcycle frames in general, provide means for physically securing and connecting the major components or systems of a motorcycle together. These components or systems typically include: the wheels, usually attached by means of front and rear suspension systems, the motor, the fuel tank, the rider's seat, and other appurtenances such as bodywork, wheel fenders, legally or safety mandated lights, etc., into a unified system.

Figure 1:
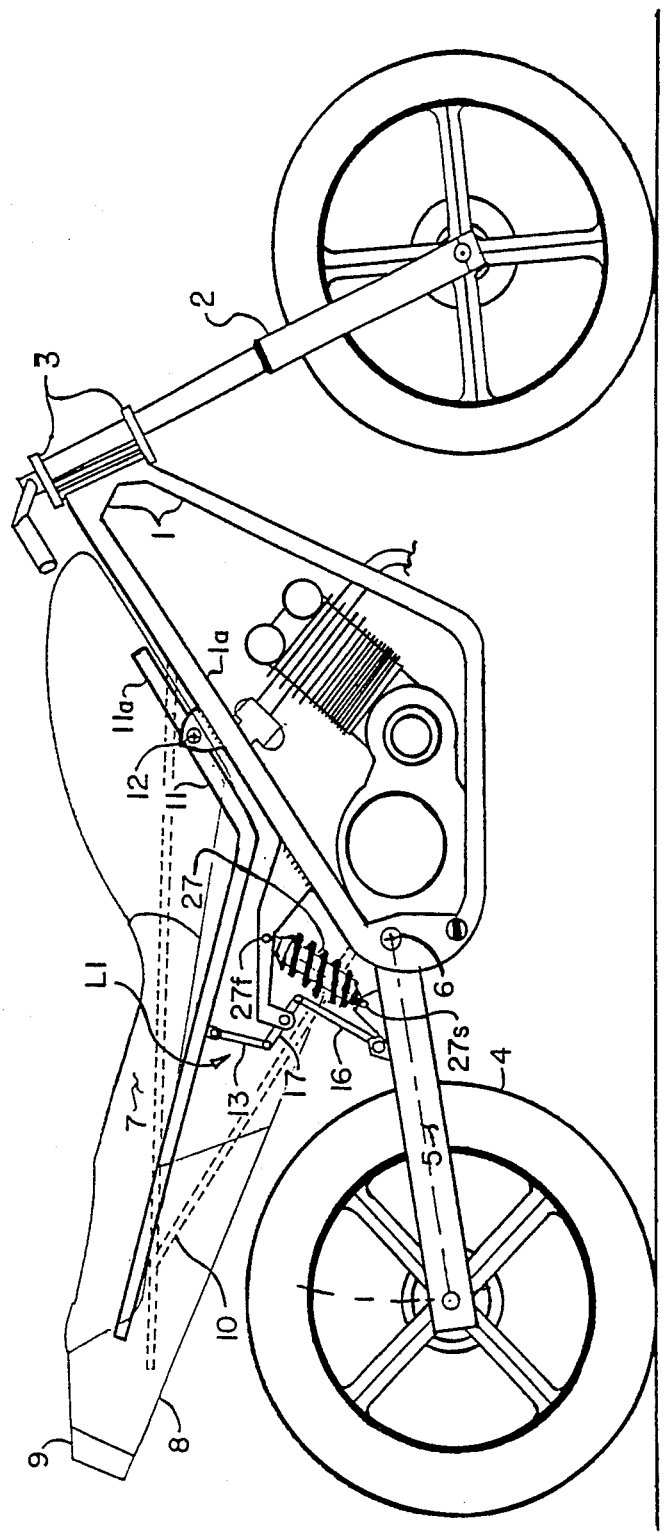
FIG. 1 is a side elevational view of a motorcycle frame, and other standard motorcycle components, specifically illustrating a simple link lever or bell crank linkage connecting the rear swingarm unit to the seat assembly which in turn is pivotally attached to the vehicle frame at a point forward of where the linkage with the rear suspension is attached.

Referring to FIG. 1, the frame 1, is a rigid framework usually fabricated of steel or aluminum, which supports the front suspension 2, also referred to as a front fork, by means of a triple clamp system 3, or a suitable alternative arrangement. In the rear of the vehicle, the frame normally supports the rear wheel 4 by means of a rigid element 5, commonly referred to as a swingarm, swingarms, or a swingarm unit. The swingarm unit, element 5, is pivotally attached to frame 1 along an axis 6 perpendicular to the vertical lengthwise plane of the vehicle. The rearward extension(s) of the swingarm element 5 supports an axle parallel to pivot axis 6, around which the rear wheel 4 can rotate. The path that the rear wheel 4 follows relative to the frame, between the rear wheel's limits of travel, is described by an arc whose center is at pivot 6, and whose radius equals the distance between pivot 6 and the rear wheel's axle. A damper or shock absorber 27 in combination with a spring is usually employed to connect each right and left side of, or the whole swingarm unit 5, to the frame 1.

FIG. 1 shows an embodiment of the present invention in which a spring and damper combination 27 is pivotally connected to the frame 1 at one of its ends 27f and to the swingarm 5 at its other end 27s.

Mechanical linkages are often used in present motorcycles for connecting the spring(s) and shock absorber(s) to the frame and/or swingarm in order to increase the effect of the spring(s) and shock absorber(s) as rear wheel deflection increases.

Present motorcycle frames commonly have a section or subframe, usually triangular in shape when viewed from the side, which supports the seat 7, along with a rear fender 8, a tail light/brake light 9, passenger's footrests (not shown), and numerous other cosmetic and functional elements. This normally triangular frame section is represented by the dashed lines 10. It is typically welded or bolted to the rest of the vehicle's frame.

A key element of this invention is a structural subframe element 11, which replaces frame section 10. It is attached to the frame 1 on either side or in the middle of the backbone 1a, of frame 1, by pivot(s) 12 or any suitable means of connection that allows the rearward portion of element 11 to move vertically relative to the frame 1. A means of making pivot 12's position adjustable on the frame such as a sliding track or multiple available pivot locations is also an option with this invention. By making pivot 12's location variable, the dynamic response characteristics of element 11 can be changed. Another benefit is that the motorcycle's seat to footrest and seat to handgrips dimensions can be changed by an individual rider to suit his or her size. In FIG. 1, a section of element 11 which extends forward of pivot 12, is noted as 11a. This forward extension of element 11 will facilitate mounting a fuel tank, a storage compartment, an equipment housing, or other components if it should be deemed undesirable to have the seat moving vertically or horizontally relative to them as it could otherwise be constrained to do in numerous embodiments of the present invention.

Element 11 is pivotally connected to the swingarm 5 by a linkage L1 including links 13 and 16 and bell crank 17. The link 13 is pivotally connected at one end to element 11 at a point rearward of pivot 12 and pivotally connected at its other end to one end of a link lever or bell crank 17. This link lever or bell crank 17 is pivotally mounted at some midpoint to a shaft supported by frame 1 such that it can rotate freely about that shaft within the constraints of linkage L1. Link 16 is pivotally connected at one end to the lever or crank 17 and at its other end to the swingarm 5. As the angular position of swingarm 5 relative to frame 1 changes as part of normal rear suspension action, link 16 in turn causes the link lever 17 to rotate about its frame mounted axis.

It can be seen from FIG. 1 that as swingarm 5 deflects upward, so does link 16. As link 16 moves upward, it causes lever or bell crank 17 to rotate counterclockwise relative to frame 1. This rotation of link lever 17 causes link 13 to move downward relative to frame 1. Since link 13 is pivotally connected to the rear of element 11, element 11 also moves downward when link 13 does. The end result of this linkage is a downward movement of element 11, and the seat 7 which it supports, in conjunction with upward movement of the rear wheel 4 and swingarm 5 due to normal suspension action. The opposite also occurs: upward seat movement, upon downward movement of the suspension system swingarm unit.

Figure 2:
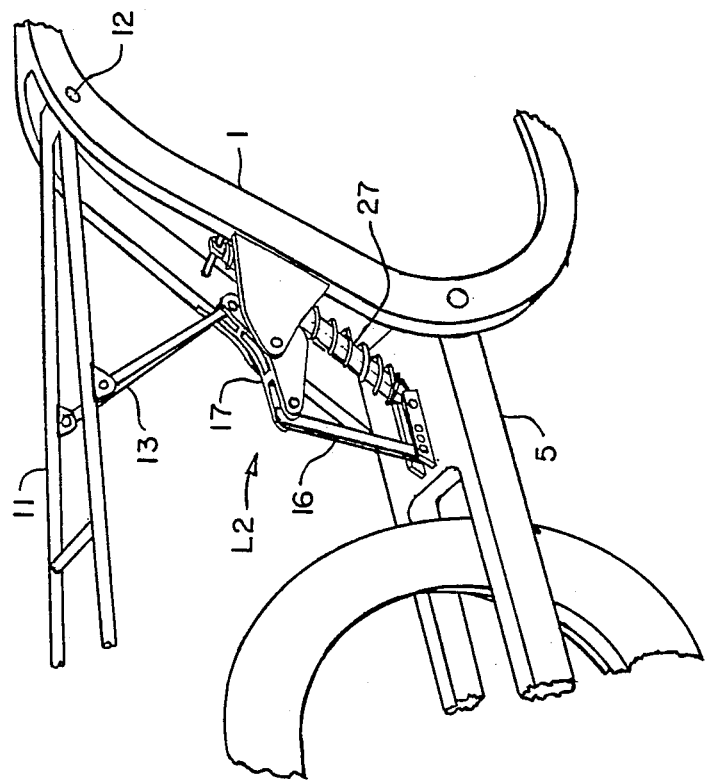
FIG. 2 is a perspective view of a linkage similar to the linkage of FIG. 1, looking somewhat downwardly and forwardly of the motorcycle frame.

FIG. 2 illustrates a linkage L2 similar to the embodiment of FIG. 1, incorporating a link lever or bell crank 17 pivotally mounted to frame 1 and pivotally connected to links 16 and 13 which in turn are pivotally connected to the swingarm 5 and seat mounting element 11, respectively. One advantage of this embodiment of the present invention is that the link lever or bell crank 17 can be designed to proportion seat deflection variably as a function of rear wheel and swingarm deflection. The spring and damper 27 connected between the frame and swingarm unit 5 could alternately be connected at its upper end to element 17 at or near where link 13 is connected to element 17, instead of being connected to the frame 1.

It would also be possible to connect the bell crank or link lever 17 to the frame 1 at a point lower than swingarm 5 with links 16 and 13 performing the same functions. This would lower the center of gravity of the vehicle, but possibly at the expense of increased overall weight.

Figure 3:
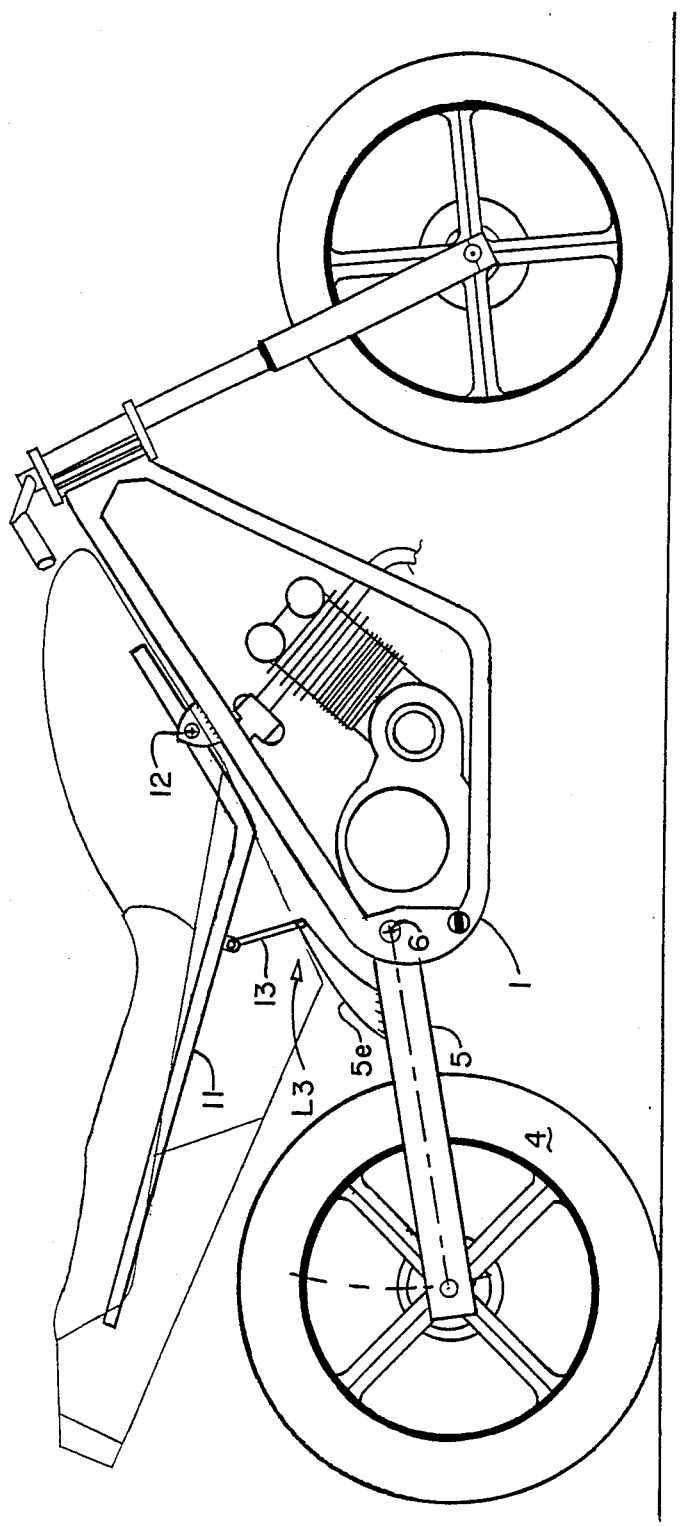
FIG. 3 is a side elevational view of another embodiment of the present invention, illustrating a simplified linkage between the swingarm unit and the seat assembly.

FIG. 3 shows a side elevational view of a motorcycle employing another linkage L3 of this invention. Either one, or a pair, of bilaterally symmetric forward extension(s) 5e of swingarm 5 from pivot 6, are connected to element 11 by means of pivotally attached parallel elements (or a single element) 13. It can be seen from FIG. 3 that as the rear wheel 4 and consequently the aft portion of swingarm 5 moves vertically upward relative to frame 1 and clockwise around pivot 6, the extension 5e of swingarm 5 forward of pivot 6 will move correspondingly clockwise and forward and/or downward relative to the frame 1. Since link(s) 13 are coupled to the forward portion of swingarm 5, they too will move downward and/or forward in conjunction with upward motion of rear wheel 4. Since the upper ends of link(s) 13 are attached to element 11 rearwardly of pivot 12, the part of element 11 rearward of pivot 12 will move downward in conjunction with upward motion of rear wheel 4. The magnitude of the downward displacement of any point of element 11, or a seat attached to it, will be a function of upward motion of the rear wheel 4, relative to frame 1, based on the instantaneous horizontal and vertical locations of the pivots connecting the different elements described in this as well as subsequent embodiments of the present invention.

Link(s) 13 may be adjustable in length, and/or the location of their upper and/or lower attachment points may be adjusted, by the manufacturer and/or user. These adjustments would ideally be manifested as simple adaptations of other commonly utilized means of changing the length of a link or a location of a pivot. This may include a two piece threaded link with rotative connections to either or both of its end pivots, and a locking nut or device, or two overlapping concentric tubes with a pin or other means fitted through aligned openings in the tubes for rendering each of the tubes immovable relative to the other. Pivot location adjustments are envisioned as multiple available positive locking means at different locations on a given bracket; as cam or snail type adjusters; or as sliding track adjustments, each having any feasible means to prevent the pivot locations from changing unless they are being adjusted by a person.

Figure 4:
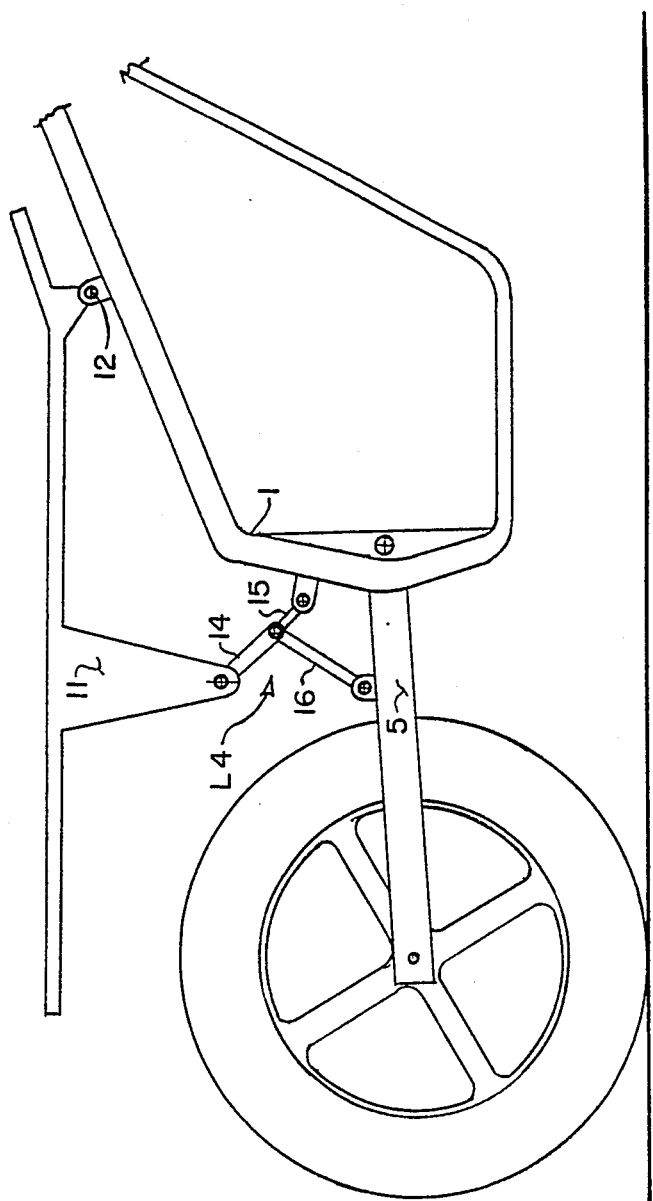
FIG. 4 is a side elevational view of only the rear portion of a motorcycle illustrating another linkage between the seat assembly and the swingarm unit.

FIG. 4 shows linkage L4 of the present invention in which the seat assembly 11 is pivotally or otherwise flexibly mounted to the frame 1 at point 12. It is also connected to the frame 1 by two links 14 and 15, or pairs thereof. Links 14 and 15 may or may not be equal to each other in length. They are pivotally connected at their mutual juncture to each other and to a third link 16 which is pivotally connected at its other lower end to swingarm 5. It can be seen from FIG. 4 that as the rear wheel 4 and swingarms 5 move upward relative to frame 1, so does link 16. As the upper end of link 16 rises, the junction of links 14 and 15 also rises and moves in an arc around the pivot connection between link 15 and frame 1. This causes links 14 and 15 to start to fold together, and to lower the pivot point between link 14 and element 11 relative to frame 1, along with the rider's seat.

Figure 5:
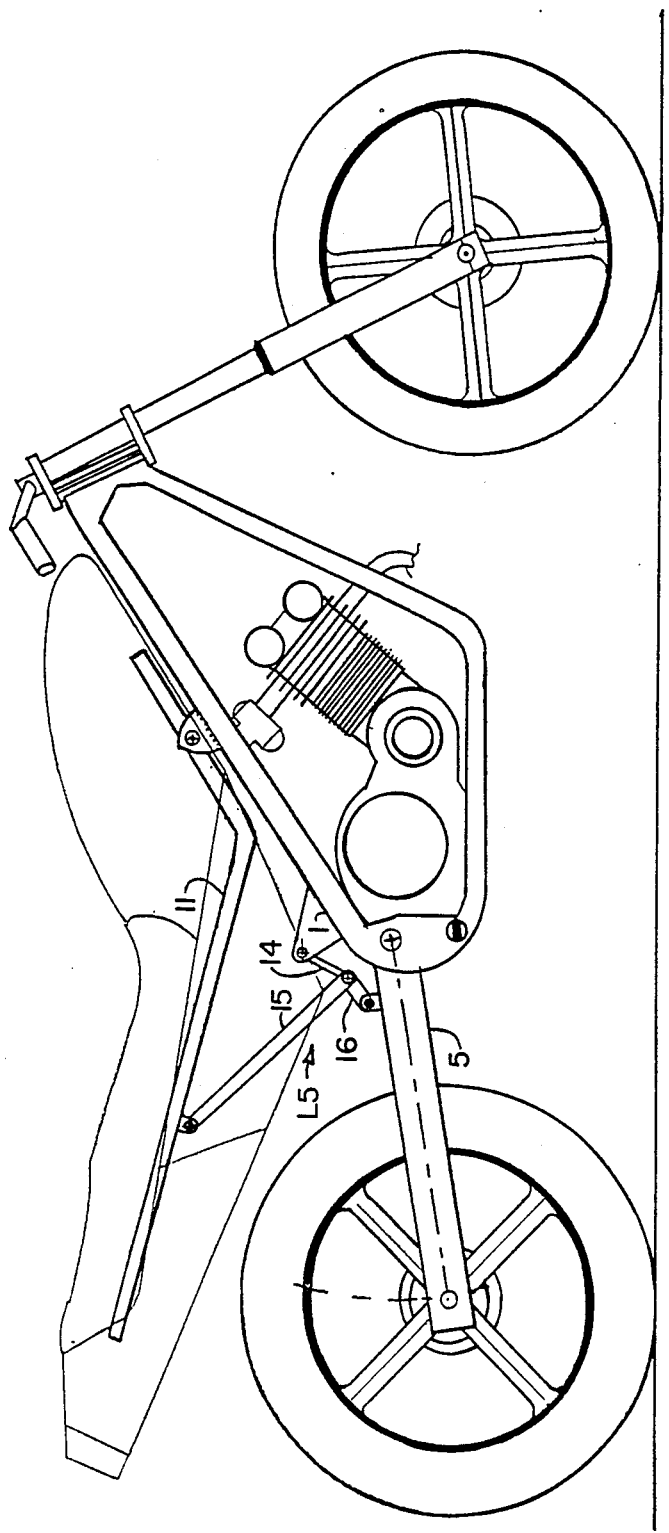
FIG. 5 is a side elevational view of a motorcycle linkage similar to that of FIG. 4.

FIG. 5 shows a subtle variation of the previous figure and description. In this linkage L5 of the present invention, links 14 and 16 fold back on each other and on link 15, to which one or both of links 14 and 16 are pivotally attached. Link 15 is pivotally attached at its other end to element 11. As the swingarm 5 rises, the lower end of link 15 is moved closer to the frame 1 by the folding action of links 14 and 16. As this happens, the attachment point connecting link 15 to element 11 moves downward, effecting the desired downward motion of element 11.

Figure 6:
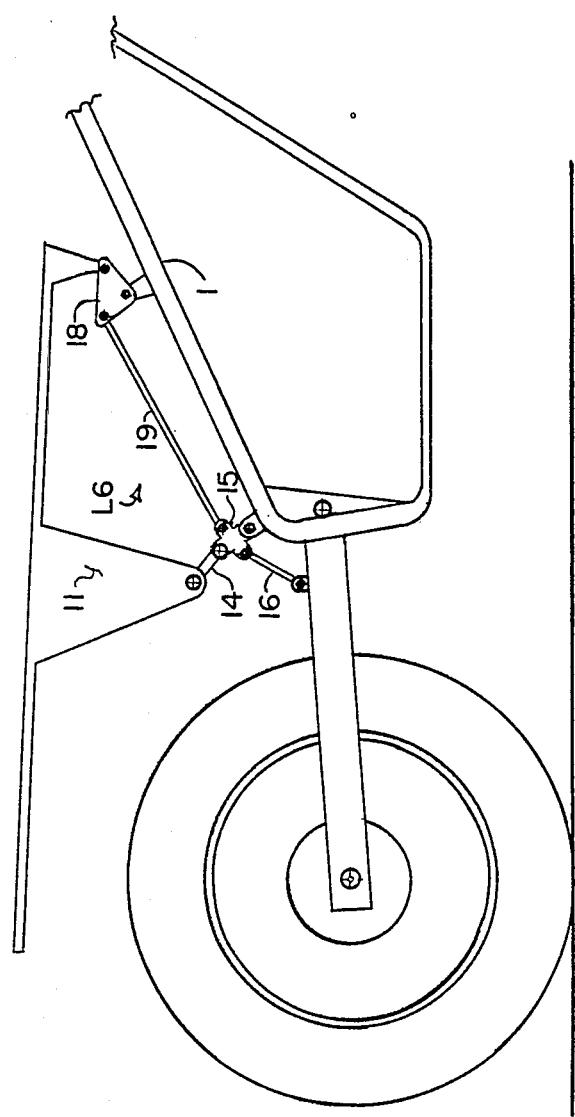
FIG. 6 is a side elevational view of the rear portion of a motorcycle, illustrating additional linkage elements which serve to introduce translational movement to the seat assembly instead of simple rotational movement possible with the configuration of the previous figures.

FIG. 6 illustrates a variation of the embodiment of this invention shown in FIG. 4. In this linkage L6, a bell crank or link lever 18 is introduced between the frame 1 and element 11, being pivotally attached to both. Pivotally attached to the link lever or bell crank 18 is also a link 19. The other end of link 19 is pivotally attached to any or all of links 14, 15 and 16. The purpose of this linkage is to cause the front of structural subframe element 11 to experience a similar or greater degree of downward motion than the rear portion of element 11, in response to upward motion of the rear wheel. This helps to prevent the rider and any passenger from sliding backward as the seat moves downward with element 11, approaching its lower limit of travel. When the rear wheel deflects upward relative to the frame 1, links 14, 15 and 16 react as described in the description for FIG. 4. That reaction causes link 19 to move in the direction toward link lever or crank 18. The subsequent clockwise rotation of bell crank 18 causes its attachment point with element 11 to move downward thus accomplishing the aforementioned objective.

Figure 7:
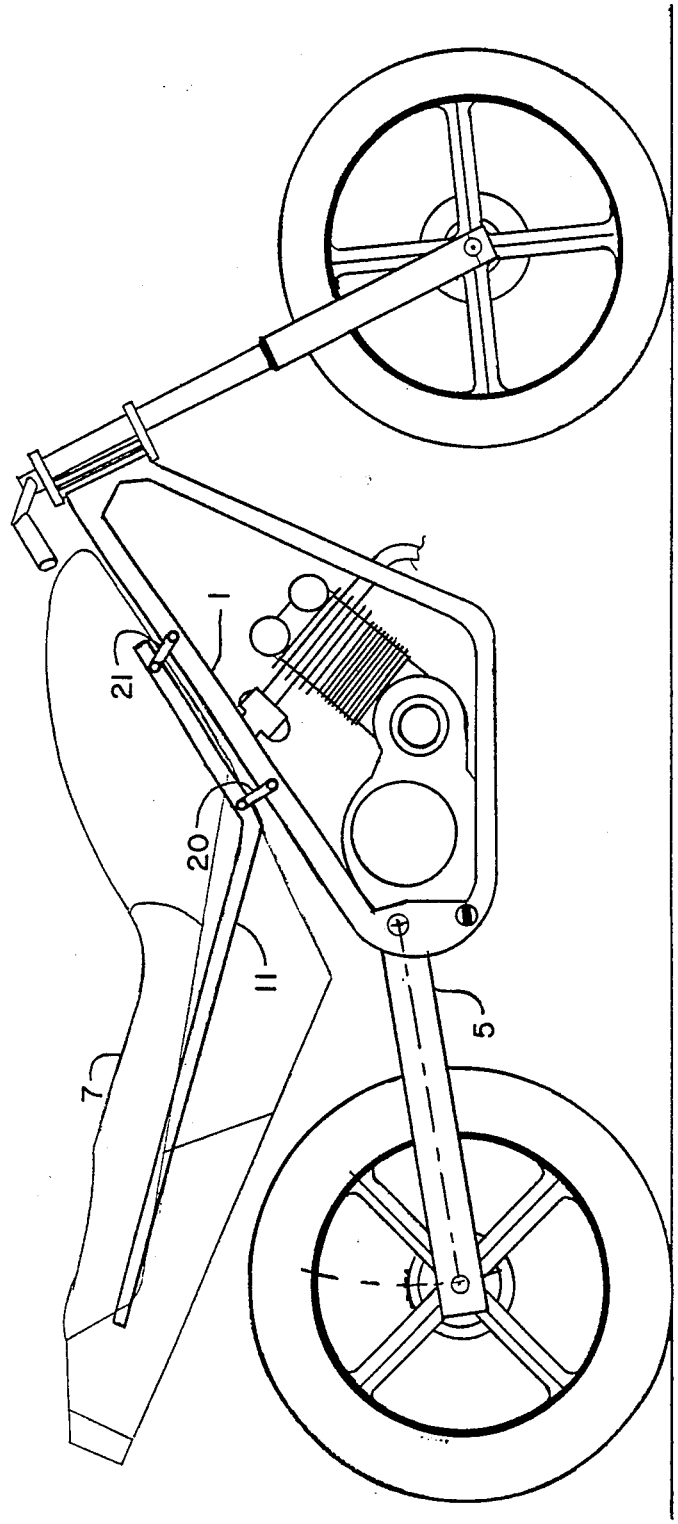
FIG. 7 is a side elevational view of a motorcycle, illustrating a four bar linkage between the seat assembly and the main frame, although for simplicity and clarity of disclosure, no means of linking the seat assembly and the rear suspension together is shown in this figure.

FIG. 7 illustrates a four bar linkage incorporating the frame 1 and a seat supporting structural subframe element 11 as two of the four linkage members. Links 20 and 21 are also members of the four bar linkage, each attached at one end to frame 1, and at the other end to element 11. The links 20 and 21 are angled relative to one another, converging slightly in the direction away from the frame 1. Links 20 and 21 can each be either single links, located in or near the vertical plane of the vehicle's longitudinal axis, or they can each be left and right halves of a pair of links positioned on either side of the aforementioned plane. No linkage coupling element 11 with the swingarm 5 of the rear suspension is shown in FIG. 7. This is because it is only intended to show that a four bar linkage could be utilized instead of the bell crank shown in FIG. 6, to provide the same control of the angle of the seat 7 that is described for the linkage associated with FIG. 6. The links 20 and 21 may have a single pivot at one end or both of their ends, and/or may be forked to have two or more coaxial pivots at one or both of their ends; or they may be triangular, rectangular, "T", or "L" shaped in the plane through their pivot points and/or axes. These options in configuration are also intended to apply to elements, links with their pivots, or just pivots, described in the other figures of this disclosure.

Figure 8:
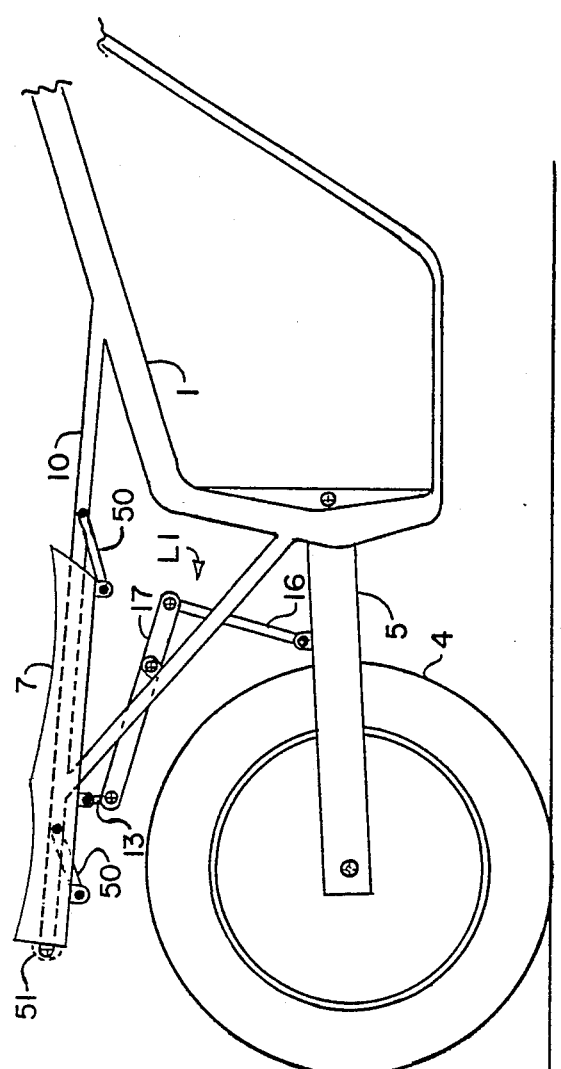
FIG. 8 is a side elevational view of the rear portion of a motorcycle, illustrating a more conventional frame and a seat pivotally attached thereto, although the same basic linkage of FIGS. 1 and 2 is shown connecting the seat and the rear suspension together.

FIG. 8 illustrates an embodiment of this invention in which the seat 7 itself is mounted to the frame 1 by any suitable number of links 50, each pivotally attached to the frame 1 at one end and to the seat 7 at the other end. The links 50 pivot around their respective connections with frame section 10, which is rigidly fixed to frame 1, causing their seat attachment points to move upward or downward within the limits determined by the linkage which conveys the motion from the rear wheel 4 and swingarm unit 5. The angle that the seat turns relative to the frame 1, is determined by the construction and relative lengths of links 50; so that it can rotate slightly downward at the front or rear, or can remain essentially at the same angle without rotation relative to the frame 1. FIG. 8 also shows the same bell crank linkage L1 that is shown in FIG. 1, including the links 13 and 16 and the bell crank 17. The difference between FIG. 1 and FIG. 8 is that only the seat 7, as opposed to a pivotally mounted structural subframe seat assembly 11, is kinematically coupled to the rear wheel suspension 5.

The double ended links 50 could be eliminated, and the seat 7 could be attached directly to the frame section 10 by one or more pivots 51 along a laterally horizontal axis at a rearward attachment point of the seat. The illustrated linkage connection to the seat 7, would remain, forming a two point seat support tied to the rear wheel suspension system. Also, whether the seat 7 is mounted by links 50 attached to the frame section 10, or by a frame mounted hinge 51 at its front or rear, its motion could be linked to that of the rear suspension element 5 by any of the other various linkage embodiments of this invention.

FIG. 9 shows an embodiment of the present invention which uses a sliding connection between the seat 7 and the triangular upper rear frame section 10. The means for effecting and sliding connection includes linear bearings or bushings with the inner races or posts 55 of the linear bearings or bushings fixed to the seat 7 and the outer races or guides 56 of the same bearings or bushings being fixed to the frame section 10, or vice versa. The axes of these linear bearings or bushings would be vertical or near vertical and would also be parallel to one another. The seat 7 is therefore constrained to travel in the same vertical or near vertical path in response to any linkage of the present invention (none shown), coupling it to the rear suspension.

FIG. 10 illustrates a cam operated linkage L7 for moving the seat 7. In this instance, structural subframe element 11 is pivotally mounted at a forward point 12 to frame 1, and the seat 7 is carried on the element 11. A cam 22 is pivotally attached to frame 1 or any other suitable member, and a link 16 is pivotally connected between the swingarm unit 5 and cam 22. The cam is caused to rotate through some fraction of one revolution in response to vertical motion of the rear suspension swingarm unit 5. The cam 22 maintains rolling or sliding contact with a cam follower 23 carried on element 11 or seat 7. The contour of the face of the cam is such that downward vertical motion of the seat can be imparted in response to upward deflection of the suspension system swingarm unit 5 and vice versa, each movement being relative to the frame 1.

FIG. 11 illustrates that footrests 24 for both rider and passenger can easily be attached to structural subframe element 11, thus providing isolation from road shocks to a rider's feet. As noted earlier, other cosmetic and functional appurtenances such as lighting and fenders, etc. can also be mounted on element 11.

FIG. 12 shows linkage L8 having a spring 25 and damper 26 combination which connects the seat 7 and/or structural subframe element 11 to the swingarm 5 of the rear wheel suspension system and/or the frame 1. In operation, the spring 25 is extended briefly in response to upward movement of the rearward portion of suspension system swingarm 5, this tends to draw the element 11 downwardly. The damper 26 slows the response of element 11 such that its motion lags that of the rear wheel suspension in time. This is desirable in the higher speed regimes of the vehicle since the time differential between the vertical response of the unsprung wheel 4 and that of the sprung or suspended main frame 1 as the vehicle encounters bumps will be greater. It can be seen from the dashed lines of FIG. 12 that the damper 26 could be alternatively be connected between the relevant suspension component and element 11, instead of between the frame 1 and element 11, thereby decreasing its time delay effect.

FIG. 13 illustrates linkage L9 of this invention in which structural subframe element 11 is pivotally connected to a hydraulic or pneumatic power piston-cylinder element 28 which in turn is pivotally connected to the frame 1, or optionally, to any suitable element in previously described linkages. Also illustrated is a conventional shock absorber 29 connected between the frame 1 and swingarm 5 of the rear wheel suspension system. The principle of operation is to effect downward motion of element 11 and seat 7 in conjunction with upward motion of the rear wheel 4 and swingarm unit 5, and vice versa, by allowing the fluid flow in element 28 to react to, and interact with, fluid flow in the rear suspension shock absorber(s) 29 or a separate similar piston-cylinder device also mounted across frame 1 and swingarm 5 (not shown), while the rear suspension is reacting to road surface irregularities. Element 28 is a piston-cylinder device similar to hydraulic or gas shock absorbers presently found in motorcycle and automotive suspension systems. The flow of the working fluid is between elements 28 and 29 which would occur when the vehicle encounters a bump, causes a corresponding but not necessarily equal reduction in length of element 28. As the spring(s) in the main suspension system restores the shock absorber 29 to its original length after the effect of the bump has been neutralized, the fluid in the shock absorber 29 also restores element 28 to its normal height relative to frame 1. The fluid transfer lines between the primary shock absorber(s) 29 and element(s) 28 are connected such that compression of element 29 by the rear wheel suspension deflection causes a reversible reduction in length of element 28, and vice versa.

FIG. 14 illustrates how piston-cylinder elements 28 and shock absorber 29 would typically be interactively coupled. As the piston 30 of shock absorber 29 is forced toward frame connection 32 by the upward movement of the rear wheel 4 acting through the swingarm 5 and the lower shock absorber mount 33, fluid is forced from chamber 60 of element 29, through line 61, into chamber 62 of element 28. As this happens, the volume of chamber 62 is increased. Within element 28, chamber 62 is separated from chamber 63 by piston 64 which is attached to pivot connection 34 which in turn is attached to element 11 or seat 7. As the volume of chamber 62 increases in indirect response to upward movement of the rear wheel 4 and the corresponding reduction in volume of chamber 60, piston 64 of element 28 and hence pivot 34 are translated linearly toward pivot 35, effectively reducing the length of element 28. Since pivot mount 35 of element 28 is attached to frame 1, the effective reduction in length of element 28 means that the connection point 34 of element 11 or seat 7 to element 28 will be forced in the direction toward the connection point 35. In the configuration of elements 28 and 29 in FIGS. 13 and 14, this will result in a reduction in height of the vehicle's seat 7 relative to the vehicle's frame 1. Compression spring 65 may be used optionally for counterbalancing the weight of the rider, to prevent a gradual flow of the fluid in chamber 63 past piston 64 to the chamber 62. The double dashed line of FIG. 14 surrounds a flowchart for an alternative automated system 68 for tuning the flow of the working fluid of elements 28 and 29 to maximize comfort to the rider. The system 68 utilizes electronically encoded information on the vehicle's speed along with information concerning the instantaneous front or rear wheel dynamics or movements, obtained by any suitable position, velocity or acceleration sensing means, such as transducers (not shown), to modulate the fluid flow between elements 29 and 28, such as by any type of electronically controlled valve 37 in line 61, or in return line 66, between chambers 63 and 67. The computer of this control system 68 would also process information on gross and net weights of the vehicle, obtained from any suitable strain gages or other sensors (not shown) to determine the optimum seat response based on the aforementioned parameters.

The single dashed line of FIG. 14 surrounds an alternative automated system 60 for actuating piston 64 of element 28. Instead of using fluid flow from element 29, a pressurized fluid reservoir 70 mounted on the motorcycle would provide the necessary pressurized fluid for controlling the position of piston 64 and hence pivot connection 34 and element 11 or seat 7 relative to frame 1. Some present motorcycles already carry a self contained pumping system which is engine powered through the electrical system. These pumping systems are used to increase or decrease the pressure within front and rear suspension elements in order to effect changes in suspension frames. As such, it is feasible to couple the same pressurized fluid to element 28. The high pressure fluid source 70 would be coupled to chambers 62 and 63 of element 28 through lines 71 and 72. Both lines 71 and 72 would have electronically modulated valves which would be closed, or partly or fully opened, based on signals from the computer in the control system 68. As either of valves 38 which control fluid flow to chambers 62 and 63 of element 28 is opened, one of the release valves 39 in either of lines 75 which lead to fluid accumulator 76 from chamber 62 or 63 is also opened simultaneously to facilitate a pressure differential across piston 64 of element 28, causing the controlled movement of piston 64, and ultimately, controlled vertical motion of the vehicle seat 7.

FIG. 15 illustrates an electromechanically controlled embodiment of the present invention. In this embodiment, neither the seat 7, nor the seat mounting structural subframe 11, is mechanically coupled to the element of the rear suspension, although such a hybrid combination of this electromechanical system and any of the previously described mechanical embodiments of this invention is certainly possible. Element 80 is an electronically controlled varible length electromechanical device which is pivotally connected at its upper end 81 and lower end 82 to the seat 7 or seat mounting subframe element 11, and to frame 1, respectively. With the appropriate electronic input, element 80 rapidly increases or decreases in length as measured by the linear distance between both of its pivot connection ends 81 and 82. With the lower end 82 of element 80 pivotally connected to frame 1 and its upper end 81 pivotally connected to seat 7 or to element 11, any increase or decrease in its axial length will increase or decrease respectively, the distance between the seat 7 and frame 1. Electronic control for element 80 will come from the schematically diagramed system components also shown in FIG. 15. In this system, the front suspension 2 acts as a sensor to determine the characteristics of road or track irregularities. By means of any suitable front fork pressure, position, velocity or acceleration transducer (not shown) for locating the position of the front wheel relative to the frame, a computer can process electronic signals which will vary based on road surface elevation changes, vehicle speeds, front and rear suspension component sprung versus unsprung weights, front wheel versus rear wheel weight distributions, and rates of change of vehicle speeds. The computer will be programmed to read fixed values such as vehicle empty weight from a memory and utilize additional sensors to sample variable factors including speed, rider load, and longitudinal vehicle accelerations. This may provide a speedometer input to the computer and a means for calculating the time lag between when the front suspension encounters a surface irregularity and when the rear suspension will encounter it to adjust element 80 properly to counteract the effect of the surface irregularity. Based on these inputs and preprogrammed equations utilized by the computer, electronic signals are sent to element 80, or to an intermediate power switching device, to actuate element 80, effecting the desired changes in its length. A variation of this might replace the front suspension status sensing element with a corresponding rear suspension sensing transducer. The speedometer input to the computer would still be used to determine the dynamic response of the vehicle from suspension inputs, since such computations would require that vehicle speed be known.

Also, such an electromechanical element 80 can be used in conjunction with the mechanical systems detailed in previous drawings and explanations, if the computer is properly programmed to account for the linkage.

I claim:

1. A motorcycle having a main frame, a rear wheel, a suspension system supporting the rear wheel relative to the frame, a rider's seat, means for supporting the seat to move relative to the frame, and a means for moving the rider's seat responsive to movement of the rear wheel suspension system, operable to provide that upward movement of the rear wheel relative to the main frame causes a related downward displacement of the rider's seat relative to the main frame, and vice versa.

2. A motorcycle according to claim 1 wherein said suspension system including a rear swingarm unit pivoted near its forward end relative to the main frame and rotatively supporting near its rear end the rear wheel, said suspension system also being composed of a spring and damper combination controlling the motion of the rear wheel, and wherein the means supporting the seat includes a structural subframe element pivotally attached relative to the main frame at a point forward of where the rider's seat itself is attached to said structural subframe element, to facilitate vertical travel of the rider's seat when said structural element pivots around its main frame attachment point.

3. A motorcycle according to claim 2, further including an engine and its subsystems supported by the main frame and further including a fuel tank, a rear fender and fairing, and rear brake and directional lights, all carried on said structural subframe element.

4. A motorcycle according to claim 2 wherein said means for moving the seat responsive to the suspension system includes a linkage connected between the rear suspension system and the structural subframe element, said linkage providing that a vertical motion of the rear wheel causes a corresponding but not necessarily equal vertical motion of the seat in the opposite direction.

5. A motorcycle according to claim 4, wherein said linkage includes a crank and means pivotally mounting said crank medially of its ends to the main frame, a pair of link means, and means pivotally connecting corresponding ends of each respective link means to the respective crank ends and respectively connecting the opposite ends to the swingarm unit and to the subframe element.

6. A motorcycle according to claim 4, wherein said linkage includes a link and means pivotally connecting one end of the link to the swingarm unit at a location forward of and/or above the forward end of the swingarm unit pivotally connected to the main frame, and means pivotally connecting the other end of the link to the structural subframe element.

7. A motorcycle according to claim 4, wherein said linkage includes three double ended links and means connecting one end of each link together, and means connecting the opposite ends of each link respectively to the swingarm unit, the main frame, and the structural subframe element, and the two links connected to the swingarm unit and to the structural subframe element being angled relative to each other in any configuration, to cause said two links to fold back on each other and thereby change the distance between the seat and rear wheel responsive to the movement of the suspension system.

8. A motorcycle according to claim 2 wherein said means supporting the seat includes means pivotally connected at spaced locations from each other relative to the structural subframe at one end and relative to the main frame at the other end, with the lengths and attachment points of said pivotally connected means being such that a specific combination of rotational and translational motion is imparted to the seat instead of simple rotational motion.

9. A motorcycle according to claim 1, wherein said means supporting the seat includes a pair of links and means connecting the opposite ends of the links to the seat and to the main frame respectively, whereby the seat is constrained to travel in a mostly vertical path in response to rear wheel movement and the corresponding movement of the suspension system.

10. A motorcycle according to claim 1, wherein said means supporting the seat includes a set of linear bearings with means fixing the inner race of each bearing to the main frame and means fixing the corresponding outer face of each bearing to the seat, or vice versa, whereby the seat is constrained to travel in a vertical or near vertical linear path in response to rear wheel movement and the corresponding movement of the suspension system.

11. A motorcycle according to claim 4, wherein said linkage includes a cam and means pivotally connecting said cam to the main frame, a cam follower and means connecting the cam follower to the structural subframe element, and a means connecting the swingarm unit to the cam, such that vertical motion of the swingarm unit results in rotational motion of the cam with a consequent vertical motion of the cam follower, and hence the seat, in the opposite vertical direction from the swingarm unit.

12. A motorcycle according to claim 2, further including footrests fixed to the structural subframe element, instead of to the main frame.

13. A motorcycle according to claim 4, wherein said linkage includes a spring and damper located therein, said spring acting to delay the transmission of sudden swingarm unit motion to the structural subframe element, wherein the damper operates to control the oscillating tendencies of said spring and to increase the delaying action of the spring.

14. A motorcycle according to claim 4, wherein said linkage includes an axial actuator device and means pivotally connecting one end of the device directly to the structural subframe element and the other end of the device to the main frame, so that the effective length of said axial actuator device and the height of the rider's seat relative to the frame are related, and means to vary the effective length of the axial actuator device responsive to the suspension system, such that a vertical motion of the swingarm unit causes a corresponding but not necessarily equal vertical motion of the seat in the opposite direction.

15. A motorcycle according to claim 14, wherein said axial actuator device includes a power piston-cylinder device, and further wherein the suspension system includes power shock absorbers and means including fluid flow through lines connected between said piston-cylinder device and the shock absorbers such that increased shock absorber compression resulting from upward travel of the swingarm unit will cause a similar compression of said piston-cylinder device.

16. A motorcycle according to claim 14, wherein said axial actuator device includes a power piston-cylinder device having a piston, said piston-cylinder device having internal chambers on each side of said piston, a high pressure fluid source, a low pressure fluid accumulator, and means including fluid flow lines and valves in the lines linking the piston-cylinder device with the pressure source and the accumulator, and a control responding to the position of the suspension system relative to the main frame operable to shift the valves to expand or contract the piston-cylinder device thereby controlling the seat height in response to movement of the suspension system.

17. A motorcycle according to claim 16, further including a rear wheel and a suspension system suspending the rear wheel for vertical movement relative to the frame and wherein said control responds to the position of the rear wheel suspension system.

18. A motorcycle according to claim 14, wherein said axial actuator device includes an electromechanical device operable to expand or contract along its axis between its pivotable mounting means in response to power, and means including sensors to determine parameters that normally would effect the ride of the motorcycle and a computer using inputs from said sensors to adjust said electromechanical device and thereby compensate for said parameters by determining the desired rate of seat deflection and return.

* * * * *

REEXAMINATION CERTIFICATE (3323rd)

United States Patent [19]
Odom

[11] B1 4,765,432
[45] Certificate Issued Sep. 16, 1997

[54] MOTORCYCLE HAVING A SUSPENSION COUPLED SEAT

[76] Inventor: H. Paul Odom, 1711 Forest Cove Dr., Mt. Prospect, Ill. 60056

Reexamination Request:
No. 90/004,308, Jul. 17, 1996

Reexamination Certificate for:
Patent No.: 4,765,432
Issued: Aug. 23, 1988
Appl. No.: 52,837
Filed: May 21, 1987

[51] Int. Cl.⁶ .................................................. B62K 25/20
[52] U.S. Cl. .................................... 180/227; 180/284
[58] Field of Search ........................... 180/219, 227; 280/284, 285, 283, 288

[56] References Cited

U.S. PATENT DOCUMENTS

| | | | |
|---|---|---|---|
| 1,829,946 | 11/1931 | Schmitt | 267/224 |
| 4,058,181 | 11/1977 | Buell | 180/227 |
| 4,076,271 | 2/1978 | Doncque | 280/284 |
| 4,322,088 | 3/1982 | Miyakoshi et al. | 280/284 |
| 4,327,930 | 5/1982 | Tominaga et al. | 280/284 |
| 4,360,214 | 11/1982 | Isono | 280/284 |
| 4,408,674 | 10/1983 | Boyesen | 180/227 |
| 4,415,057 | 11/1983 | Yamaguchi et al. | 180/227 |
| 4,433,850 | 2/1984 | Miyakoshi et al. | 280/277 |
| 4,457,393 | 7/1984 | Tamaki et al. | 180/227 |
| 4,489,803 | 12/1984 | Fukuchi | 180/227 |
| 4,506,755 | 3/1985 | Tsuchida | 180/227 |
| 4,515,236 | 5/1985 | Kanamori | 180/227 |
| 4,544,044 | 10/1985 | Boyesen | 180/227 |
| 4,556,119 | 12/1985 | Shiratuschi | 180/219 |
| 4,574,909 | 3/1986 | Ribi | 180/227 |
| 4,582,343 | 4/1986 | Waugh | 280/284 |
| 4,596,302 | 6/1986 | Suzuki et al. | 280/284 |
| 4,621,706 | 11/1986 | Boyesen | 180/227 |

FOREIGN PATENT DOCUMENTS

| | | |
|---|---|---|
| 497017 | 11/1919 | France . |
| 21274 | 8/1920 | France . |

*Primary Examiner*—Kevin Hurley

[57] ABSTRACT

A motorcycle is disclosed having a seat suspension system that is designed to move said seat in the opposite direction, relative to the frame, from the rear wheel when the rear wheel encounters bumps. A structural member is pivotally connected to the backbone of the frame at a location above the motor or near there. This pivoting structural member supports the seat and other components such as rear lights, side panels, rear fender, etc. It is caused to move downward relative to the main frame in response to upward motion of the rear suspension, by linkage means connecting it to the rear suspension. As the motorcycle frame experiences sudden upward motion due to bumps transmitted through the wheel suspension, the seat moves downward at the same time to prevent those bumps from disturbing the rider.

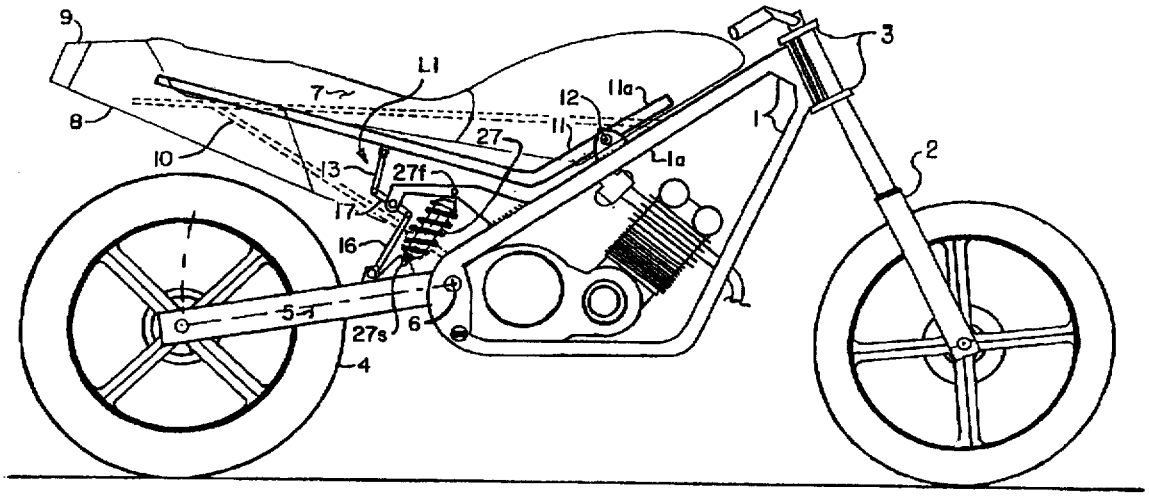

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–18, dependent on an amended claim, are determined to be patentable.

New claims 19–22 are added and determined to be patentable.

1. A motorcycle having a main frame, a rear wheel, a suspension system supporting the rear wheel relative to the frame, a rider's seat, means for supporting the seat to move relative to the frame, *a swing arm pivotally mounted to the frame,* and a means for moving the rider's seat responsive to movement of the rear wheel suspension system, operable to provide that upward movement of the rear wheel relative to the main frame causes a related downward displacement of the rider's seat relative to the main frame, and vice versa, said means for moving the rider's seat including a mechanism permitting substantial free movement of the rear wheel relative to the frame and free movement of the rider's seat relative to the main frame without binding, and without bending movement of the swing arm.

*19. A motorcycle having a main frame, a rear wheel, a suspension system supporting the rear wheel relative to the frame including a rear swing arm pivoted on a fixed axis near its forward end to a lower portion of the main frame, said swing arm extending substantially horizontally, a rider's seat, means for supporting the seat to move relative to the frame, and a means for moving the rider's seat responsive to movement of the rear wheel suspension system, operable to provide that upward movement of the rear wheel relative to the main frame causes a related downward displacement of the rider's seat relative to the main frame, and vice versa, said means for moving the rider's seat including a mechanism permitting free movement of the rear wheel relative to the main frame and free movement of the rider's seat relative to the main frame without binding, said mechanism interconnecting the rear wheel swing arm and the rider's seat and being located at or above the swing arm fixed pivotal axis on the main frame to minimize the required mechanism.*

*20. A motorcycle having a main frame, a rear wheel, a suspension system supporting the rear wheel relative to the frame including a rear swing arm pivoted on a fixed axis near its forward end to a lower portion of the main frame, said swing arm extending substantially horizontally, a rider's seat, means for supporting the seat to move relative to the frame, and a means for moving the rider's seat responsive to movement of the rear wheel suspension system, operable to provide that upward movement of the rear wheel relative to the main frame causes a related downward displacement of the rider's seat relative to the main frame, and vice versa, said means for moving and vice versa, said means for moving the rider's seat including a mechanism permitting free movement of the rear wheel relative to the main frame and free movement of the rider's seat relative to the main frame without binding, said mechanism interconnecting the rear wheel swing arm and the rider's seat and being located above the swing arm fixed pivotal axis on the main frame to minimize the required mechanism, said mechanism interconnecting the rear wheel swing arm and the rider's seat being located entirely above the swing arm fixed pivotal axis on the main frame to minimize the required mechanism.*

*21. A motorcycle having a main frame, a rear wheel, a suspension system supporting the rear wheel relative to the frame including a rear swing arm pivotal on a fixed axis near its forward end to a lower portion of the main frame, said swing arm extending substantially horizontally, a rider's seat, means for supporting the seat to move relative to the frame, and a means for moving the rider's seat responsive to movement of the rear wheel suspension system, operable to provide that upward movement of the rear wheel relative to the main frame causes a related downward displacement of the rider's seat relative to the main frame, and vice versa, said means for moving the rider's seat including a mechanism permitting free movement of the rear wheel relative to the main frame and free movement of the rider's seat relative to the main frame without binding, said mechanism interconnecting the rear wheel swing arm and the rider's seat and being located at or above the swing arm fixed pivotal axis on the main frame to minimize the required mechanism, said mechanism interconnecting the rear wheel swing arm and the rider's seat including a linkage assembly pivotally mounted at one end to the swing arm at a point above the fixed pivotal axis of the swing arm on the main frame.*

*22. A motorcycle having a main frame, a rear wheel, a suspension system supporting the rear wheel relative to the frame including a rear swing arm pivoted on a fixed axis near its forward end to a lower portion of the main frame, said swing arm extending substantially horizontally, a rider's seat, means for supporting the seat to move relative to the frame, and a means for moving the rider's seat responsive to movement of the rear wheel suspension system, operable to provide that upward movement of the rear wheel relative to the main frame causes a related downward displacement of the rider's seat relative to the main frame, and vice versa, said means for moving the rider's seat including a mechanism permitting free movement of the rear wheel relative to the main frame and free movement of the rider's seat relative to the main frame without binding, said mechanism interconnecting the rear wheel swing arm and the rider's seat and being located at or above the swing arm fixed pivotal axis on the main frame to minimize the required mechanism, said mechanism interconnecting the rear wheel swing arm and the rider's seat including a linkage assembly pivotally mounted at one end to the swing arm at a point above the fixed pivotal axis of the swing arm on the main frame, said linkage assembly including a crank arm pivotally mounted to the main frame at a point above the fixed pivotal axis of the swing arm on the main frame, a first linkage means pivotally connected at one end to the swing arm above the fixed pivotal axis of the swing arm on the main frame and connected at its other end to the crank arm, and a second link means pivotally connected at one end to the crank arm and connected at its other end to the seat supporting means.*

* * * * *